W. S. BOWIE.
ODORLESS COOKING APPARATUS.
APPLICATION FILED JAN. 10, 1908.
903,127.
Patented Nov. 3, 1908.
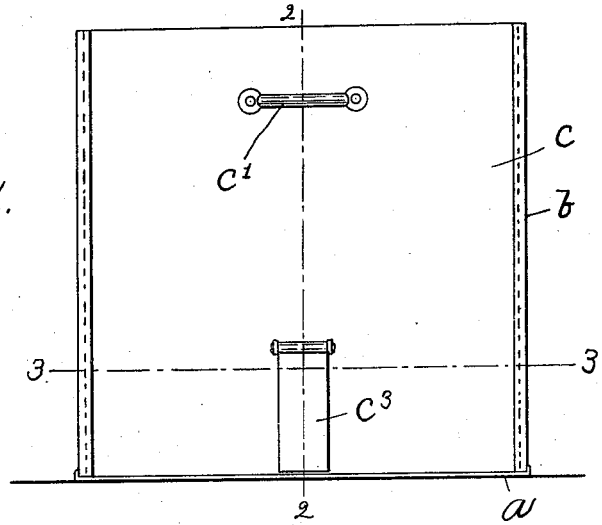
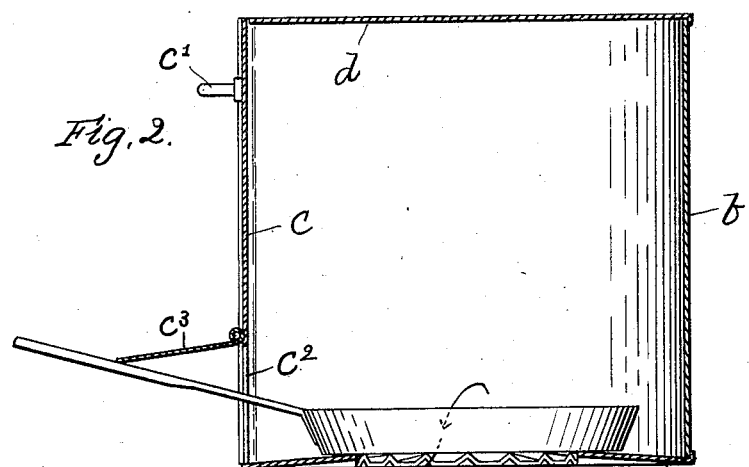
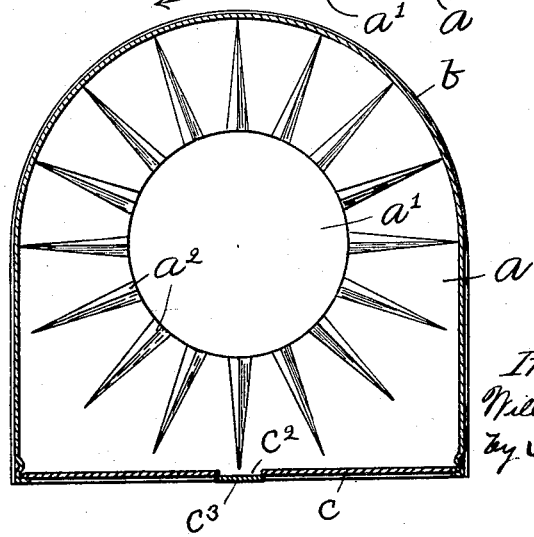
Witnesses:
H. B. Davis.
Cynthia Doyle.
Inventor:
William S. Bowie

UNITED STATES PATENT OFFICE.

WILLIAM S. BOWIE, OF BOSTON, MASSACHUSETTS, ASSIGNOR TO THE BOWIE MANUFACTURING COMPANY, OF BOSTON, MASSACHUSETTS, A CORPORATION OF MASSACHUSETTS.

ODORLESS COOKING APPARATUS.

No. 903,127.　　　Specification of Letters Patent.　　　Patented Nov. 3, 1908.

Application filed January 10, 1908. Serial No. 410,117.

*To all whom it may concern:*

Be it known that I, WILLIAM S. BOWIE, of Boston, county of Suffolk, State of Massachusetts, have invented an Improvement in Odorless Cooking Apparatus, of which the following is a specification.

This invention relates to odorless cooking apparatuses and has for its object to construct an improved form of receptacle adapted to be placed upon a stove, over one of the holes thereof, which is constructed and arranged to form a closed compartment to contain a frying-pan or other cooking utensil and support it over the hole in the stove and sufficiently elevated above the bottom of the receptacle to provide beneath it suitable passageways for the escape of the odors. Also to provide the receptacle with a vertically sliding door of such dimensions that when opened a frying pan or other cooking utensil may be introduced into the receptacle, and while contained therein is accessible so as to enable anything contained in it to be turned or stirred.

Figure 1 shows in front elevation an odorless cooking receptacle embodying this invention. Fig. 2 is a vertical section of the receptacle shown in Fig. 1, taken on the dotted line 2—2 and containing a frying-pan. Fig. 3 is a cross section of the receptacle taken on the dotted line 3—3, Fig. 1, showing in plan view the bottom plate.

The bottom plate $a$ is composed of sheet metal. It has a circular hole $a'$ through it, corresponding to the shape and size of the hole in the stove. It has supports $a^2$ for supporting a frying-pan or other cooking utensil in an elevated position to thereby provide suitable passageways beneath the cooking utensil for the escape of the odors. These supports and passageways are formed by making ribs or corrugations in the plate which extend in a radial direction from the edge of the hole toward the outer edge of the plate. The ribs or corrugations are preferably so made as to gradually decrease in height from their inner to their outer ends, and they may terminate inside of the outer edge of the plate. This manner of forming the supports for the cooking utensil is simple and provides the necessary passageways between them for the escape of the odors, but I do not desire to limit my invention to arranging them radially, as herein shown.

When in use, the cooking utensil rests upon the supports, and the odors pass along the passageways between the supports, through the hole in the plate and enter the hole in the stove.

The bottom plate $a$ is made of a shape corresponding to the shape which it is desired to give to the receptacle.

Side walls $b$ extend upwardly from the edge of the bottom plate, which, as herein shown, comprises the opposite sides and one end wall of the receptacle, the opposite end thereof being left open to provide for the door. The door $c$ is made as a sheet metal plate and its side edges enter guideways formed in the edges of the side walls. These guideways extend vertically and hence the door is arranged vertically and is free to slide in a vertical direction. The door is provided with a handle $c'$ by which it may be operated. The receptacle is made of such dimensions as to completely inclose ordinary cooking utensils, but owing to the extended handle usually provided on a frying-pan, and some other cooking utensils, the door is provided with a vertical slot $c^2$ at its lower end, through which said handle may project, as shown in Fig. 2, and a lid $c^3$ provided for closing said opening $c^2$, when a cooking utensil not having an extended handle is being used.

A top plate $d$ is attached to the upper edge of the side walls, which extends forward to the door $c$, so that when the door is closed a compartment is formed which completely or substantially incloses the cooking utensil and supports the same above the hole in the stove and provides for the escape of the odors. The top plate $d$ is preferably made flat so that dishes may be placed thereon and heated or kept warm.

Having thus described my invention, what I claim as new and desire to secure by Letters Patent is:—

An odorless cooking receptacle having a bottom plate provided with a hole corresponding to the hole in the stove and having elevated supports for a frying-pan separated to provide passageways between them for the escape of the odors, side walls extending upwardly from said bottom plate having vertical guideways from top to bottom for the edges of the sliding door, a top wall on said side walls, and a sliding door of a width aproximately equal to the diameter of the receptacle extending from top to bottom thereof, whereby the frying-pan may be introduced or removed at the side of the receptacle by raising said door, and having a slot at its lower end for the handle of the frying-pan, substantially as described.

In testimony whereof, I have signed my name to this specification, in the presence of two subscribing witnesses.

WILLIAM S. BOWIE.

Witnesses:
B. J. NOYES,
H. B. DAVIS.